HENRY COGHLAN & HAROLD COGHLAN.
MACHINE FOR GRADING AND SEPARATING CEREALS AND OTHER GRANULAR SUBSTANCES OR MATERIALS.
APPLICATION FILED SEPT. 11, 1914.

1,209,120.

Patented Dec. 19, 1916.
2 SHEETS—SHEET 1.

Witnesses
Alfred Bosshardt
Ferdinand B. Bosshardt

Inventors
Henry Coghlan
Harold Coghlan
Per Ferdinand Bosshardt
Attorney

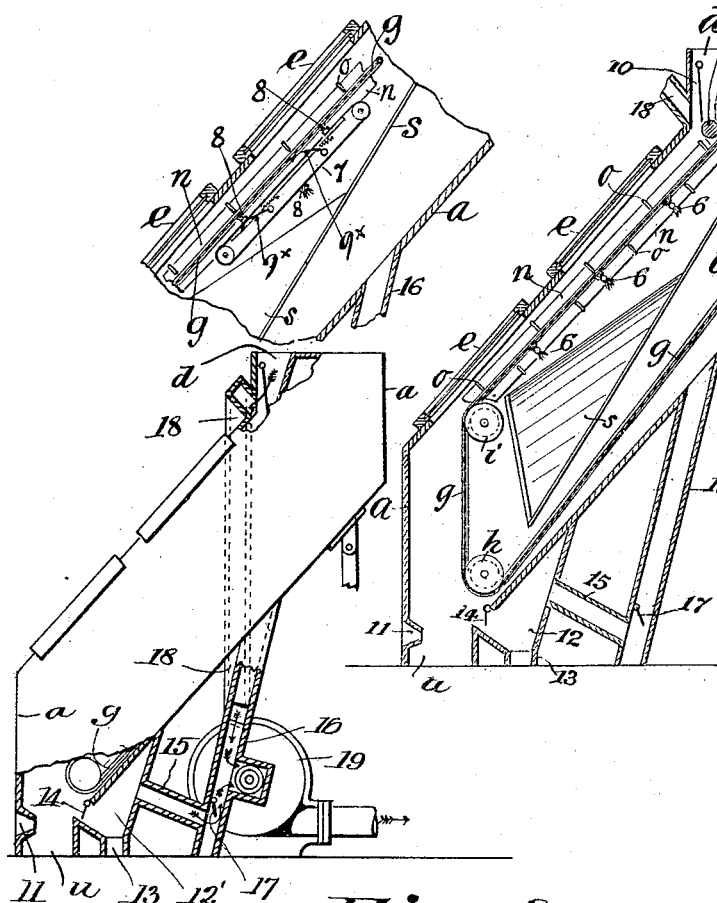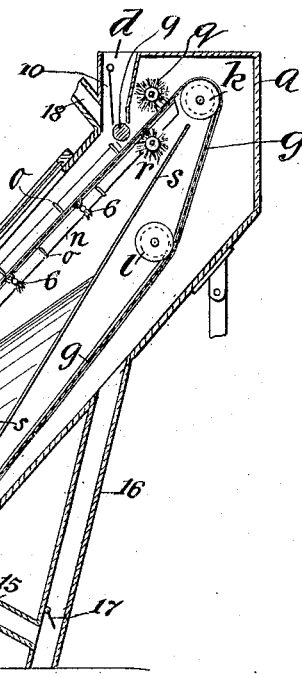

UNITED STATES PATENT OFFICE.

HENRY COGHLAN AND HAROLD COGHLAN, OF STOCKPORT, ENGLAND.

MACHINE FOR GRADING AND SEPARATING CEREALS AND OTHER GRANULAR SUBSTANCES OR MATERIALS.

1,209,120.

Specification of Letters Patent.

Patented Dec. 19, 1916.

Application filed September 11, 1914. Serial No. 861,258.

*To all whom it may concern:*

Be it known that we, HENRY COGHLAN and HAROLD COGHLAN, subjects of the King of Great Britain, and residents of Stockport, in the county of Cheshire, England, have invented certain new and useful Improvements in Machines for Grading and Separating Cereals and other Granular Substances or Materials, of which the following is a specification.

Our invention relates to improvements in that type of machines for grading or separating cereals and other granular substances or materials in which an endless traveling sieve is employed upon which the substance or material to be graded or separated is fed in connection with means for keeping the meshes of the said sieve open such as a brush or brushes and means for collecting and delivering out of the machine the substance or material dropping through the meshes of the said sieve and termed "throughs." In practice it has been found that the said means do not properly keep the meshes of the sieve open and the process of grading or separating is thereby rendered irregular and greatly impeded.

The object of our invention is the provision of means whereby the said defects are overcome.

To this end our invention consists in the construction of a grading or separating machine which comprises chiefly an endless upwardly traveling sieve mounted at an incline and passing between a pair of rotary brushes arranged behind the feed of the machine and rotating in a direction opposite to that of the said sieve, of means for causing the said sieve to vibrate intermittently so as to cause the substance or material fed to continuously gravitate thereon and also augment the action of the said pair of brushes, and of means for aspirating the lighter particles of the material from the feeding device or the outlet of the machine or from both. We attain this object by the means illustrated in the accompanying three sheets of drawings, in which—

Figure 4:
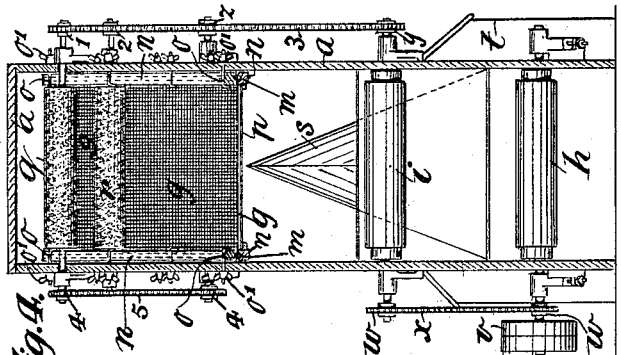
Figure 5:
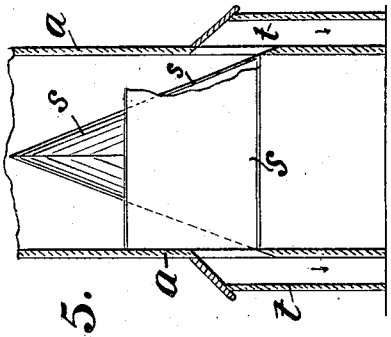
Figure 3:
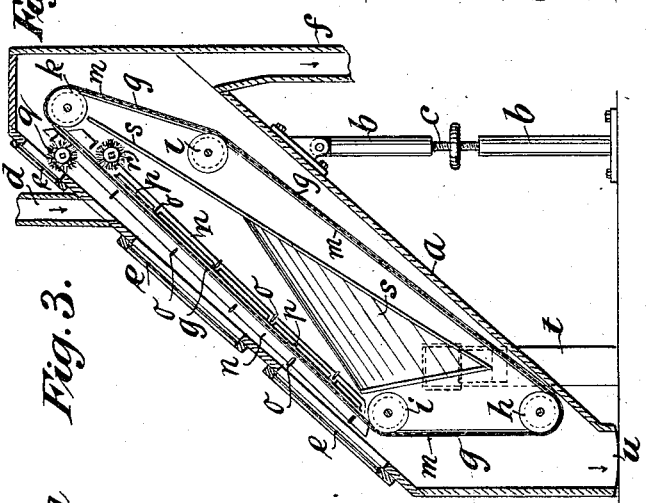
Figure 1:
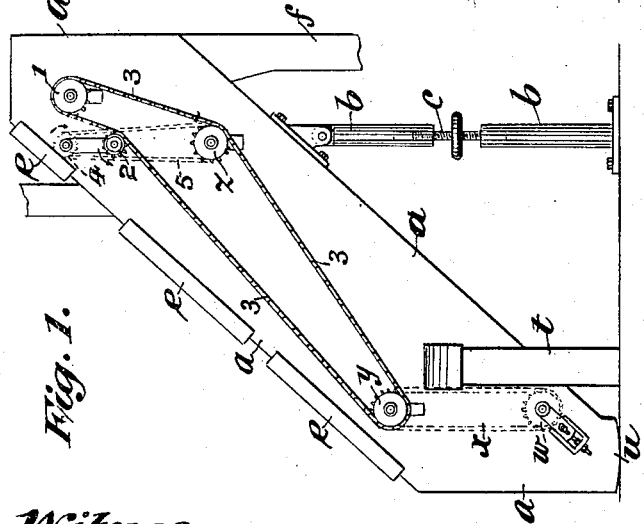
Figure 2:
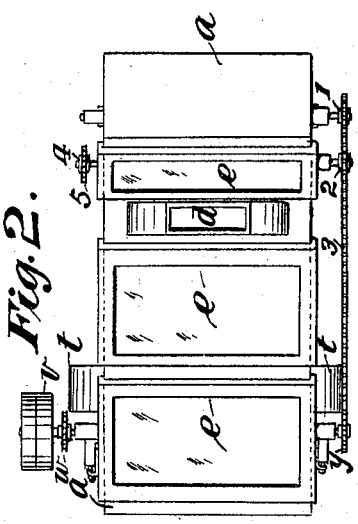

Figure 1 is an elevation, Fig. 2 a plan, Figs. 3 and 6 are longitudinal sections, Fig. 4 a sectional end view, and Fig. 5 a detached sectional view of a grading or separating machine constructed in accordance with one embodiment of our invention. Fig. 7 is a detached longitudinal section, and Fig. 8 a side view partly in section of modifications of our improved machine.

Similar letters refer to similar parts throughout the several views.

In carrying out our invention and referring to Figs. 1, 2, 3, 4 and 5, *a* is the body of our improved grading or separating machine arranged at a suitable incline which if desirable may be varied by furnishing the upper end of the machine with a leg *b* rendered variable in length, say by a right and left handed screw *c*. *d* is the inlet for the substance or material to be graded or separated, which in the present instance takes the form of a chute, *e* are the covers of the machine, and *f* the exhaust. *g* is the said endless traveling sieve in the present instance carried by four rollers *h*, *i*, *k*, *l*, mounted in suitable bearings on each side of the machine, the bearings of one of the said rollers, say those of *h* being rendered adjustable to keep the sieve *g* always longitudinally at the proper tension as shown in Figs. 1 and 4.

In order to enable of mounting the sieve *g* crosswise at its proper tension so as not to sag due to its own weight, each edge thereof is furnished with a rope or other flexible member *m* engaging in runners *n* rendered relatively adjustable on the inner side of the machine by means of clamps *o* and wing nuts *o'* located outside thereof.

In order to prevent the sieve *g* from sagging due to the substance or material fed thereon and the latter from being unevenly distributed and accumulating in the middle of the sieve, we employ immediately below the same a grid or the like support *p*, carried by ledges formed on the runners *n*, *n*.

The means for keeping the meshes of the sieve *g* open and thereby prevent the substance or material fed adhering to the sieve after leaving the said feeding device consists of two rotary brushes *q* and *r* arranged to run in contact with both surfaces of the sieve in a direction opposite to the direction in which the sieve travels so as to continuously brush it and thus keep the meshes always open and also prevent the substance or material being carried upward.

The means for collecting the "throughs" which drop through the meshes of the sieve *g* consist of an inclined trough *s* extending between the sides from near the upper to near the lower end of the body of the machine and the lower end of which is made up and has an upwardly extending deflector Λ shaped in cross section. The "throughs" dropping into the said trough gravitate toward the lower Λ shaped end thereof which conveys them to each side of the machine where they drop through openings into the outlet pipes $t$, see more particularly Fig. 5. The substance or material graded or separated leaving the endless traveling sieve $g$ at the roller $i$, drops into the trunk $u$ from whence it passes out of the machine.

In the present instance motion is imparted to the endless traveling sieve $g$ by a pulley $v$ on one end of the shaft of the bottom roller $h$ at the lower end of the machine driving from the said shaft the respective top roller $i$ by means of sprocket wheels $w$ and a chain $x$, then driving on the opposite side of the machine from the top roller $i$ by means of the sprocket wheels $y$, $z$, 1, 2 and chain 3, the rollers $l$ and $k$ at the upper end of the machine and the bottom brush $r$, and the top brush $q$ from the bottom roller $l$ by means of the sprocket wheels 4 and chain 5.

In order to insure of the meshes of the sieve $g$ remaining also perfectly open while the sieve is traveling toward the said feeding device and thereby obtaining a constant gravitation of the substance or material fed on the sieve, one or more segmental brushes 6 are employed as shown in Fig. 6 to rotate in contact with the underside of the sieve $g$ which brushes besides brushing the sieve, cause the sieve to vibrate sufficiently to prevent any adherence of the material thereto. The same effect may be obtained by employing an endless traveling band 7 as shown in Fig. 7 furnished with a suitable number of flat brushes 8 arranged in connection with a number of spring influenced knockers, 9" pivoted to the machine sides and adapted to be depressed by the said brushes as they pass over them and when released thereby, to strike the sieve and thereby cause it to vibrate and shake off the material liable to adhere thereto. In lieu of feeding the material upon the sieve $g$ direct from a hopper $d$ it may be fed upon the sieve $g$ by means of a roller 9 and gate 10, as shown in Fig. 6.

Referring again to Fig. 6, in order to permit of separately collecting the lighter particles from the graded or separated material while falling into the outlet $u$, we form the latter in front with an air inlet 11 and at the back with a chamber 12 extending from a collecting trough 13 having an outlet and furnished with a valve 14. This chamber has an exhaust trunk 15 communicating with an exhaust trunk 16 extending from the bottom of the machine and having a valve 17. Both trunks are connected to a fan 19, as shown in Fig. 8, whereby the said lighter particles are drawn from the outlet $u$ into the chamber 12 and collected in the trough 13, and from below the sieve $g$ into the trunk 17 and then passed out of the machine. For the same purpose the feeding device of the machine at $d$ may also be provided with an exhaust trunk 18 which as in the present instance may be connected with the trunk 16 or direct with the fan 19, as may be found most convenient.

We claim:

1. In a machine for grading or separating cereals and other granular substances or materials of the type hereinbefore referred to, an endless traveling sieve mounted at an incline, means for rotating the said sieve in an upward direction, a feeding device located near the upper end of the said sieve to supply the said sieve with the substance or material to be treated, a pair of rotary brushes located behind the said feeding device for the said sieve to pass through and adapted to loosen the portion of the substance or material which has become fast in the meshes of the sieve before the sieve commences its downward run, and means located in front of the said feeding device below the said sieve for intermittently vibrating and brushing the sieve to cause the substance or material fed to continuously gravitate thereon and also augment the action of the said pair of brushes, for the purpose specified.

2. In a machine for grading or separating cereals and other granular substances or materials of the type hereinbefore referred to, an endless traveling sieve mounted at an incline, a feeding device near the upper end of the said sieve, a pair of rotary brushes between the said feeding device and upper end of the said sieve between which brushes the said sieve passes and which run in a direction opposite to that in which the said sieve moves, an outlet at the lower end of the machine, and means in connection with the said feeding device and the said outlet for aspirating the lighter particles from the material and collecting the same, for the purpose specified.

Signed at Manchester in the county of Lancaster, England this 31st day of August A. D. 1914.

HENRY COGHLAN.
HAROLD COGHLAN.

Witnesses:
ALFRED BOSSHARDT,
FERDINAND B. BOSSHARDT.